(12) United States Patent
Jones et al.

(10) Patent No.: US 8,608,189 B2
(45) Date of Patent: Dec. 17, 2013

(54) FOLD-AWAY WHEELBARROW SYSTEMS

(76) Inventors: Kendall Jones, Richmond, VA (US); Marita Friend, Richmond, VA (US)

(*) Notice: Subject to any disclaimer, the term of this patent is extended or adjusted under 35 U.S.C. 154(b) by 241 days.

(21) Appl. No.: 12/977,396

(22) Filed: Dec. 23, 2010

(65) Prior Publication Data

US 2011/0175332 A1 Jul. 21, 2011

Related U.S. Application Data

(60) Provisional application No. 61/296,230, filed on Jan. 19, 2010.

(51) Int. Cl.
*B62B 1/20* (2006.01)

(52) U.S. Cl.
USPC .......................................... 280/653; 280/651

(58) Field of Classification Search
USPC .................................. 280/653, 651
See application file for complete search history.

(56) References Cited

U.S. PATENT DOCUMENTS

| | | | | |
|---|---|---|---|---|
| 2,800,335 | A * | 7/1957 | Clapp | 280/42 |
| 3,722,904 | A | 3/1973 | Puckett | |
| 4,109,933 | A * | 8/1978 | O'Brian et al. | 280/653 |
| 4,401,313 | A * | 8/1983 | Filas | 280/47.31 |
| 4,669,743 | A * | 6/1987 | Tipke | 280/42 |
| 4,781,396 | A | 11/1988 | King | |
| 4,887,836 | A * | 12/1989 | Simjian | 280/651 |
| 4,957,306 | A * | 9/1990 | Greenberg | 280/652 |
| 4,958,846 | A * | 9/1990 | Greenberg | 280/652 |
| 5,222,757 | A | 6/1993 | Magyar | |
| 5,607,174 | A | 3/1997 | Ambrogio | |
| 5,806,878 | A * | 9/1998 | Mroczka et al. | 280/653 |
| 6,733,026 | B1 * | 5/2004 | Robberson et al. | 280/415.1 |
| 6,764,093 | B2 * | 7/2004 | Allsop et al. | 280/653 |
| 6,811,179 | B2 * | 11/2004 | Woods | 280/652 |
| 6,824,152 | B1 * | 11/2004 | Scott | 280/79.7 |
| 6,845,991 | B1 * | 1/2005 | Ritucci et al. | 280/30 |
| 6,869,098 | B2 | 3/2005 | Tomchak et al. | |
| 6,902,184 | B2 * | 6/2005 | Hsu | 280/653 |
| 7,097,182 | B1 * | 8/2006 | Liu | 280/42 |
| 7,226,072 | B2 * | 6/2007 | Shapiro | 280/653 |
| 7,481,446 | B2 * | 1/2009 | Lowe | 280/653 |
| 7,562,897 | B1 * | 7/2009 | Sherman et al. | 280/651 |
| 7,703,795 | B2 * | 4/2010 | Williamson | 280/656 |
| 7,708,299 | B2 * | 5/2010 | Duval et al. | 280/401 |
| 7,780,175 | B2 | 8/2010 | McCalley | |
| 2003/0205885 | A1 * | 11/2003 | Woods | 280/652 |
| 2011/0175332 | A1 * | 7/2011 | Jones et al. | 280/653 |

* cited by examiner

*Primary Examiner* — Jeffrey J Restifo
(74) *Attorney, Agent, or Firm* — RG Patent Consulting, LLC; Rachel Gilboy (57) ABSTRACT

A fold-away wheelbarrow system is for use in moving materials from one location to another. The wheelbarrow has a shell comprised of a front, a back, a right side, and a left side that hinge together in such a way that the front may open for dumping the carried load and/or the front, back, and sides may fold via a plurality of hinges into a flat configuration for storage. The fold-away wheelbarrow is foldable such that it occupies a greatly reduced area for storage.

20 Claims, 5 Drawing Sheets

FOLD-AWAY WHEELBARROW SYSTEMS

CROSS-REFERENCE TO RELATED APPLICATION

The present application is related to and claims priority from prior provisional application Ser. No. 61/296,230, filed Jan. 19, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of wheelbarrows and more specifically relates to fold-away wheelbarrow systems.

2. DESCRIPTION OF THE RELATED ART

Many individuals employ the use of a wheelbarrow for transporting yard waste, gardening materials or heavy items from one place to another. Wheelbarrows are typically designed to distribute the weight of its load between the wheel and the operator so enabling the convenient carriage of heavier and bulkier loads than would be possible were the weight carried entirely by the operator. Wheelbarrows may be made from steel and typically have rubber tires to provide a smooth ride. Although wheelbarrows are useful tools for preventing back strain and also enable users to complete certain chores in a more efficient manner, conventional designs require a significant amount of storage space. Consumers that do not have a garage or shed may be deterred from owning a wheelbarrow simply because of their large size.

Various attempts have been made to solve the above-mentioned problems such as those found in U.S. Pat. and Pub. Nos. 5,222,757; 4,781,396; 3,722,904; 6,869,098; 5,607,174; and 2005/0012307. This prior art is representative of wheelbarrow systems. None of the above inventions and patents, taken either singly or in combination, is seen to describe the invention as claimed.

Ideally, a wheelbarrow system should be user-friendly, easily storable, operate reliably, and be manufactured at a modest expense. Thus, a need exists for a reliable fold-away wheelbarrow system to transport yard waste, gardening materials, or other such heavy items from one location to another and further be foldable such that it stores in a reduced space to avoid the above-mentioned problems.

BRIEF SUMMARY OF THE INVENTION

In view of the foregoing disadvantages inherent in the known wheelbarrow art, the present invention provides a novel fold-away wheelbarrow system. The general purpose of the present invention, which will be described subsequently in greater detail, is to provide a fold-away wheelbarrow system useful for transporting volumes of materials and also occupying less space when placed in the storage position.

A fold-away wheelbarrow is disclosed herein comprising: a body having an inner volume with the inner volume defined by a bottom planar surface, a front planar surface; a rear planar surface; a first side planar surface; and a second side planar surface. The inner volume comprises a substantially rectangular parallelepiped devoid a top-surface. The wheelbarrow sides, front, and back have a plurality of hinges for the purpose of allowing the planar surfaces to be foldable to reduce overall size for storage. The front of the wheelbarrow may have at least one wheel affixed with a fork-mounted axle to a lower frame. The frame within this particular embodiment comprising a wishbone profile and a handle-stand. The body is mounted on the lower frame which acts as a structural support for the body.

The fold-away wheelbarrow is preferably comprised of plastic and is a second-class lever. The hinges provide swingably-rotatable relationships between the front planar, the first side planar surface, the second side planar surface, and the rear planar surface such that the front planar surface is rotatable about the hinge so that the front planar surface is allowed to come into a parallel relationship adjacent to the first side planar surface and away from the second planar surface thereby providing an unimpeded dumping side for unloading the material contained therein. The fork-mounted wheel is preferably front-swivelly-mounted to the lower frame. The handle-stand within this particular embodiment may be rotatable about a centerline axis such that the wheelbarrow may be manipulatable between an in-use condition and a storage condition. The hinges allow the fold-away wheelbarrow to be relationally-rotatably manipulated such that the fold-away wheelbarrow is foldable for easy and convenient storage. The handle-stand comprises a lifting means (lifter) whereby an operator may manipulate the fold-away wheelbarrow during a load-moving period. Further, the handle-stand provides a rester while the present invention is in a stationary position. The lifter preferably comprises two hand-grippable handles. The rester may comprise a u-shaped stand rotatable in relation to the lifter means. The fold-away wheelbarrow may be carried by the fork-mounted axle designed to distribute a carried-weight-load between the wheel and the operator as a second-class lever thereby enabling convenient carriage of the carried-weight-load by the operator.

A method for using a fold-away wheelbarrow is also disclosed herein and may comprise the steps of: unfolding the fold-away wheelbarrow into an in-use condition; receiving a carried-weight-load within the confines of the wheelbarrow; carrying the carried-weight-load using the fold-away wheelbarrow as a second-class lever; rotating a front planar surface into a parallel relationship adjacent the first side planar surface and away from the second planar surface to provide an unimpeded dumping side; and unloading the carried-weight-load. The method may further comprise the step of folding the fold-away wheelbarrow into a storage profile.

The present invention holds significant improvements and serves as a fold-away wheelbarrow system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, The Fold-Away Wheelbarrow, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a wheelbarrow device and more particularly to a fold-away wheelbarrow as used to reduce the storage footprint when placed in an in-storage condition. Referring generally to the present invention, the fold-away wheelbarrow is designed to assist users in transporting heavy loads and then folds down into a compact unit for easy storage. Fold-away wheelbarrow of the present invention provides consumers with a more compact wheelbarrow design with hinges for easier storage. This novel device is ideal for consumers that may not have a garage or a shed or be otherwise limited in storage space because its slim design can be tucked away in a utility closet or hung on a wall between uses. Further, the wheelbarrow comprises various features such as a swinging front panel door that may rotate open making it ideal for men, women and children who are looking for a simpler method of transporting and unloading items.

In certain embodiments this wheelbarrow may be constructed out of heavy-duty plastic or other lightweight but suitably durable material(s). Handles may also be hinged thereby enabling them to fold inwardly for storage. Also, on the underside of the belly pan may be a wheel located in the front and two legs located in the back useful during transporting and resting conditions, respectively. For storage, the wheel may swivel-rotate and the legs fold under to provide a compact profile.

Figure 1:
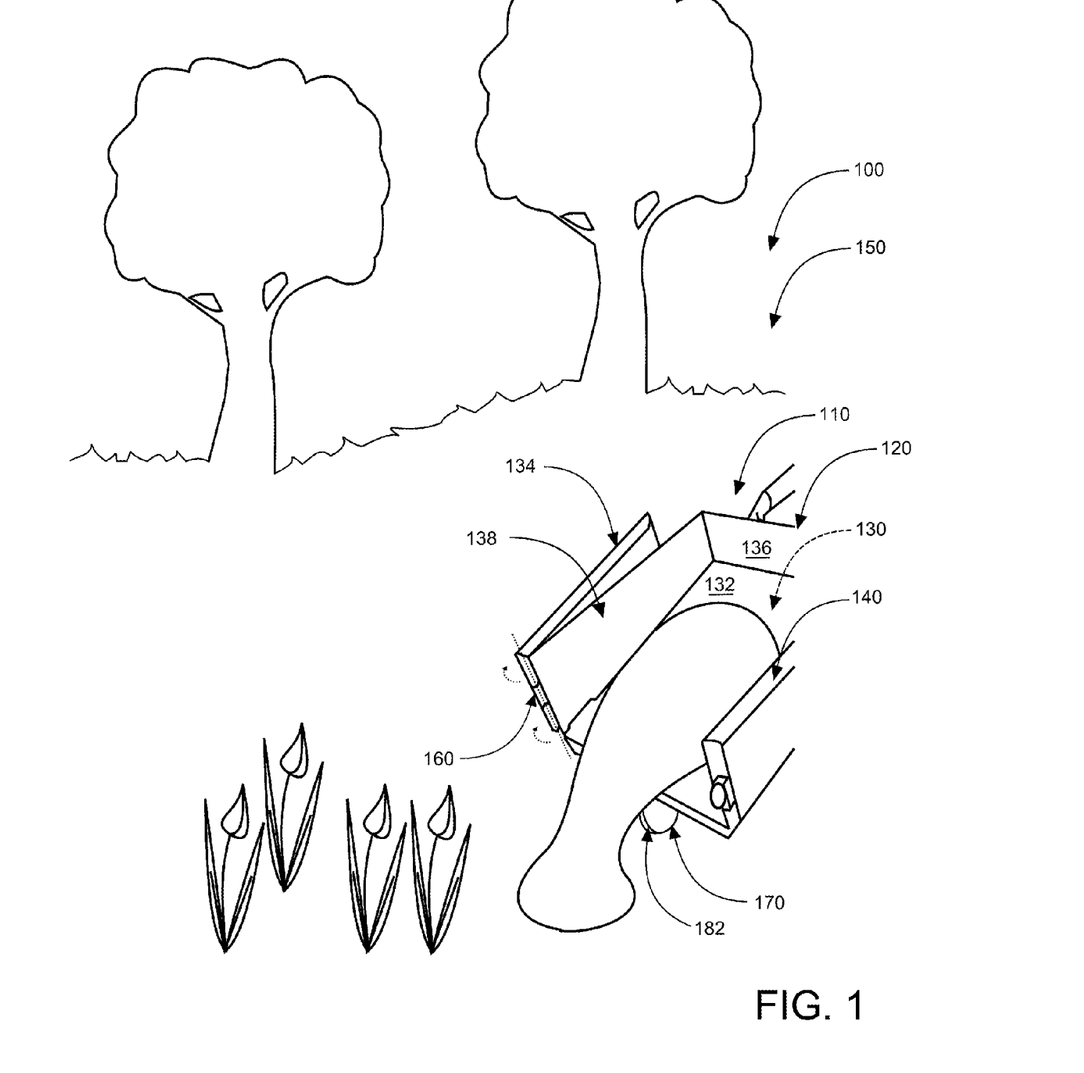
FIG. 1 shows a perspective view illustrating a fold-away wheelbarrow in an in-use condition according to an embodiment of the present invention.

Referring now to the drawings by numerals of reference there is shown in FIG. 1, a perspective view illustrating fold-away wheelbarrow 110 of fold-away wheelbarrow system 100 in an in-use condition 150 according to an embodiment of the present invention. Fold-away wheelbarrow 110 within this particular embodiment shown comprises: at least one body 120 having at least one inner volume 130. Inner volume 130 is defined by bottom planar surface 132; front planar surface 134; rear planar surface 136; first side planar surface 138; and second side planar surface 140. Inner volume 130 comprises the general shape of a rectangular parallelepiped devoid a top-surface. No top-surface is present making the present invention easy to fill, however in certain embodiments a hinged lid may be used for transport of materials that may need protection from environmental elements. Upon reading this specification, it should be appreciated that, under appropriate circumstances, considering such issues as user preferences, design preference, structural requirements, marketing preferences, cost, available materials, technological advances, etc., other inner volume shapes and arrangements such as, for example, cubed-square, oval, etc., may be sufficient.

Fold-away wheelbarrow 110 may also comprise a plurality of hinges 160 to provide a pinned-hinging means whereby front planar surface 134; rear planar surface 136; first side planar surface 138; and second side planar surface 140 are movable in relation to each other. Fold-away wheelbarrow 110 may also comprise at least one wheel 170 mounted on fork-mounted axle 180 to provide a rollable transport means whereby a load may be efficiently carried via a levering means. Fold-away wheelbarrow 110 is preferably carried by fork-mounted axle 180 designed to distribute a carried-weight-load between wheel 170 and the operator, thereby enabling convenient carriage of the carried-weight-load by the operator. In this way fold-away wheelbarrow 110 comprises an efficient second-class lever means whereby strain of the operator while moving loads is greatly reduced.

Fold-away wheelbarrow 110 may further comprise at least one lower frame 190; and handle-stand 210. Body 120 is preferably mounted on lower frame 190 to provide a structural means whereby body 120 is suitably strengthened and supported. In this way fold-away wheelbarrow 110 is able to carry a substantial load. Handle-stand 210 provides a lifter (hand-grippable lifting means) whereby an operator may manipulate fold-away wheelbarrow 110 during a load-moving period (as shown in the present figure) and handle-stand 210 provides a rester while in a stationary position, as shown in FIG. 2.

Fold-away wheelbarrow 110 preferably comprises plastic within the embodiment shown, thereby providing a lightweight construction (for hanging and pushing). Upon reading this specification, it should be appreciated that, under appropriate circumstances, considering such issues as user preferences, design preference, structural requirements, marketing preferences, cost, available materials, technological advances, etc., other structural materials such as, for example, composites, ferrous or non-ferrous materials, alloyed elements, etc., may be sufficient.

As shown in the present figure fold-away wheelbarrow 110 comprises front planar surface 134 which is rotatable about/via hinge 160 such that front planar surface 134 comes into a parallel relationship adjacent first side planar surface 138 and away from second planar surface 140. When front planar surface 134 comes into a parallel relationship adjacent first side planar surface 138 an unimpeded dumping side is thereby provided, as shown. In this way the present invention is easy to unload (dump), thereby providing convenience for the operator.

Figure 2:
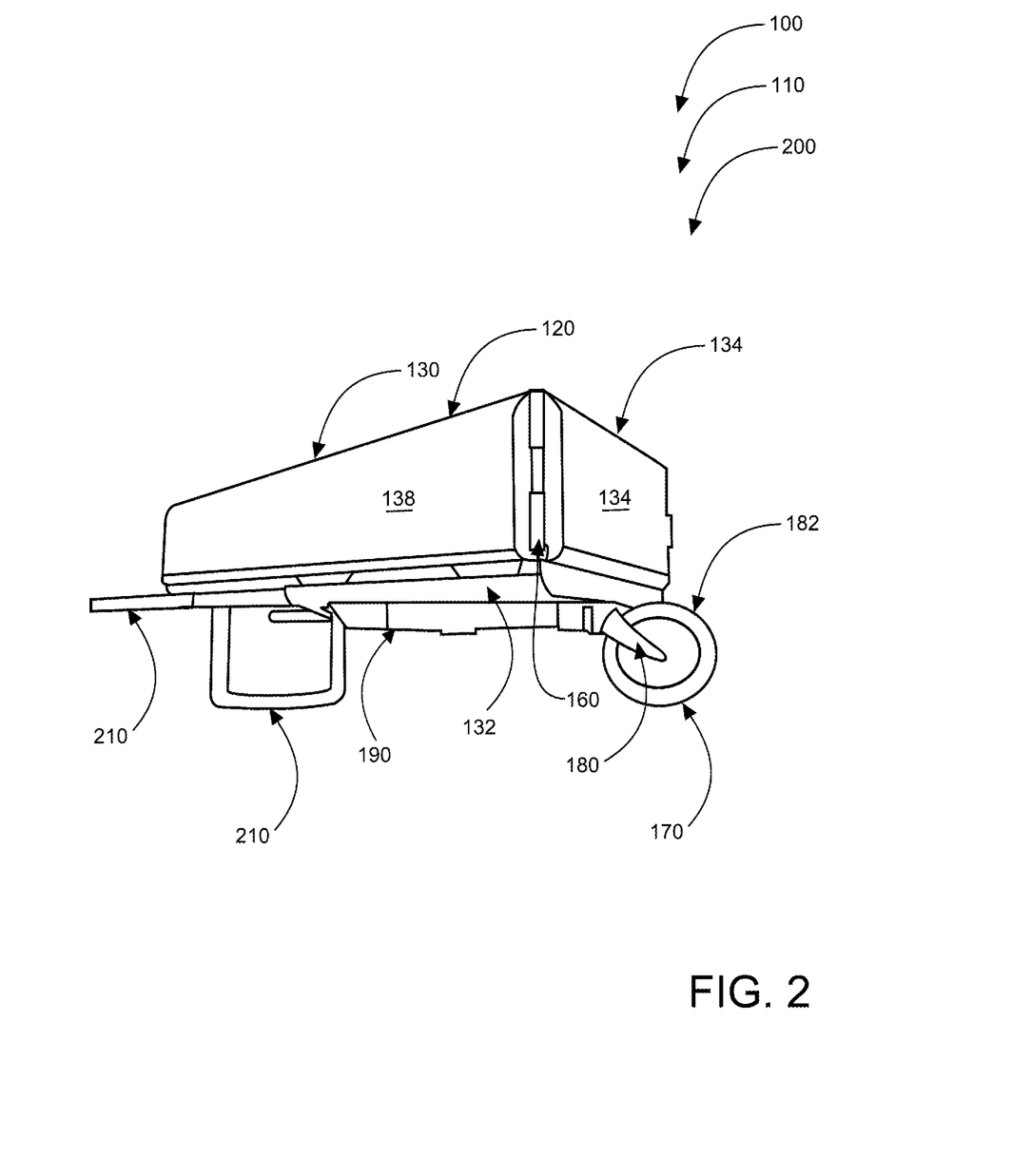
FIG. 2 is a perspective view illustrating the fold-away wheelbarrow in an at rest stationary condition according to an embodiment of the present invention of FIG. 1.

Referring now to FIG. 2, a perspective view illustrating fold-away wheelbarrow 110 in an at-rest stationary condition 200 according to an embodiment of the present invention of FIG. 1.

Fold-away wheelbarrow 110 as stated previously comprises bottom planar surface 132; front planar surface 134; rear planar surface 136; first side planar surface 138; and second side planar surface 140 comprises a lidless box profile when in at least one load-moving period. Front planar surface 134 is adjacent and perpendicularly relationally removably connected to first side planar surface 138 and second side planar surface 140 is adjacent and perpendicularly relationally removably connected to rear planar surface 136 when in a load-moving period. Hinges 160 are located on at least one edge of front planar surface 134; rear planar surface 136; first side planar surface 138; and second side planar surface 140 such that front planar surface 134; rear planar surface 136; first side planar surface 138; and second side planar surface 140 are able to be relationally-rotatably manipulated. It should be appreciated that hinges 160 may be suitably connected to other portions to provide the desired folding/using actions.

Bottom planar surface 132 preferably comprises a flat-bottom belly pan measuring approximately 3 feet wide by 3 feet long, two sloping slides 3 feet long and 1 foot high (near the handles—handle-stand 210) and 1½ feet tall near front planar surface 134 (the front panel). The front and back panels (front planar surface 134 and rear planar surface 136, respectively) may measure 1½ feet tall and 2 feet 11½ inches long. All components of body 120 may be approximately ¼ inch thick to keep the device suitably light, yet sufficiently durable. Two metal handles (handle-stand 210) may be secured to the underside of body 120 running 1½ feet along the underside of bottom planar surface 132 and protruding outwardly about 2 feet for easy usability (thereby increasing effective lever length). In certain embodiments the lengths, widths, heights may be different according to user/manufacturer preference.

Relatively speaking, bottom planar surface 132 is adjacent front planar surface 134; rear planar surface 136; first side planar surface 138; and second side planar surface 140 at perpendicular orientations. Front planar surface 134 is opposed to rear planar surface 136; first side planar surface 138 is opposed to second side planar surface 140 when in the load-moving period, thereby creating a substantially rectangular parallelepiped (not including a lid portion) for effectively enclosing/holding materials being transported within fold-away wheelbarrow 110. In this way the present invention comprises a structurally secure form.

Figure 3:
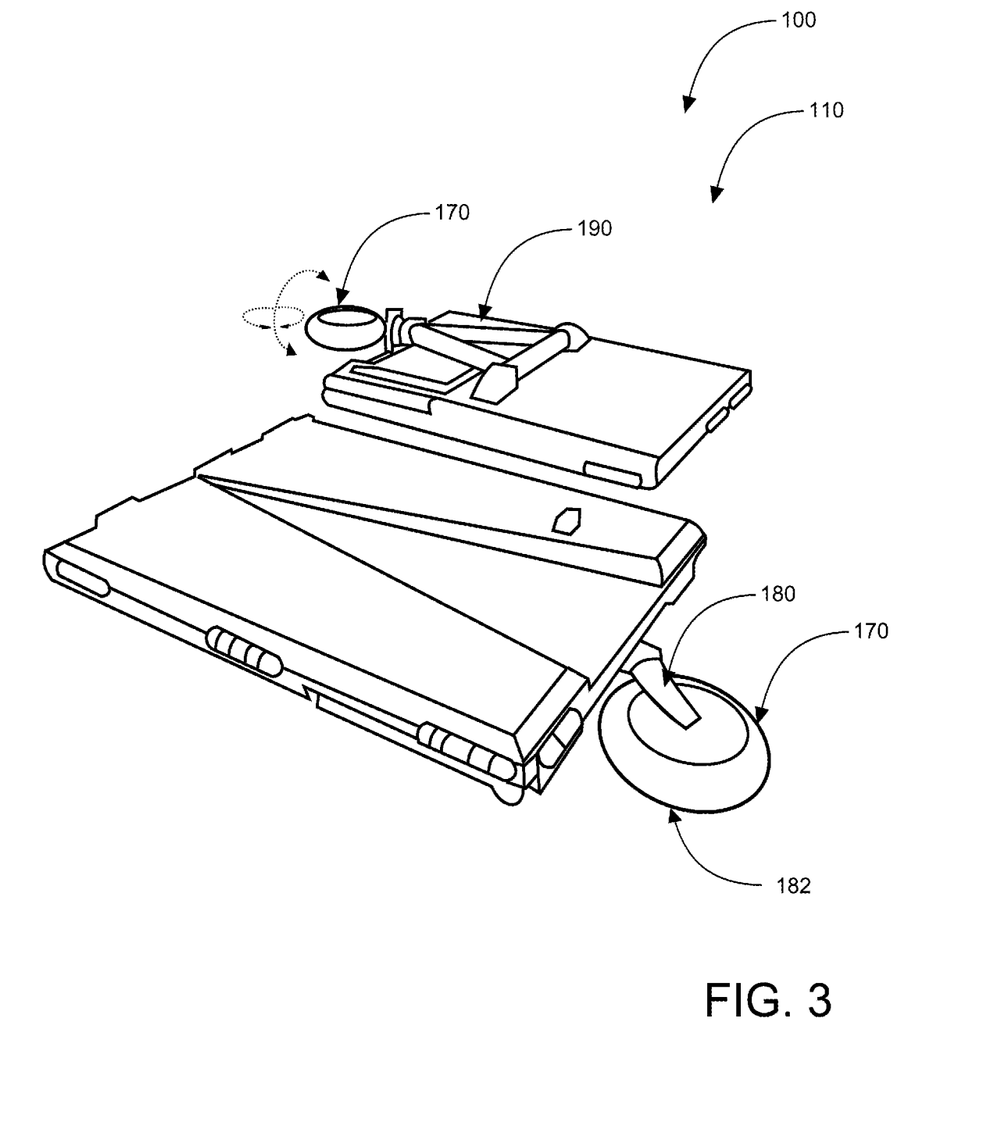
FIG. 3 is a perspective view illustrating the fold-away wheelbarrow in a folded storage-ready condition according to an embodiment of the present invention of FIG. 1.
Figure 4A:
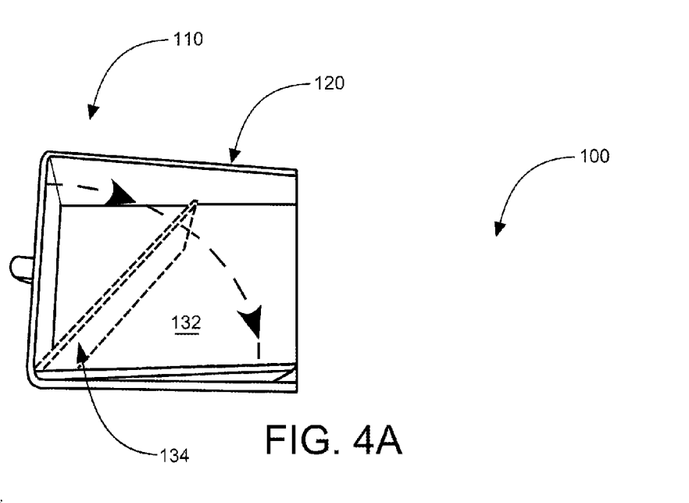
FIG. 4A is a perspective view illustrating rotation of a front planar surface of a body of the fold-away wheelbarrow according to an embodiment of the present invention as used in FIG. 1.
Figure 4B:
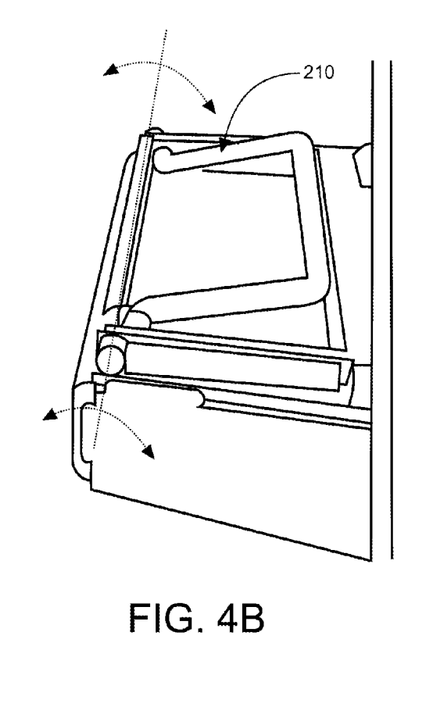
FIG. 4B is a perspective view of a handle-stand as rotated into a storage ready condition according to an embodiment of the present invention as shown in FIG. 3.
Figure 4C:
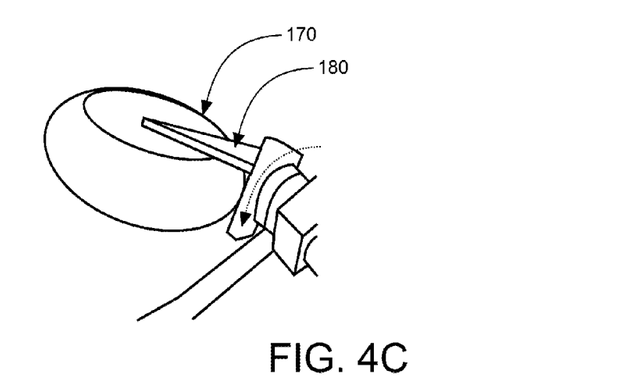
FIG. 4C is a perspective view of a fork-mounted wheel front-swivelly-mounted to a lower frame of the fold-away wheelbarrow according to an embodiment of the present invention as shown in FIGS. 1-3.
Figure 5:
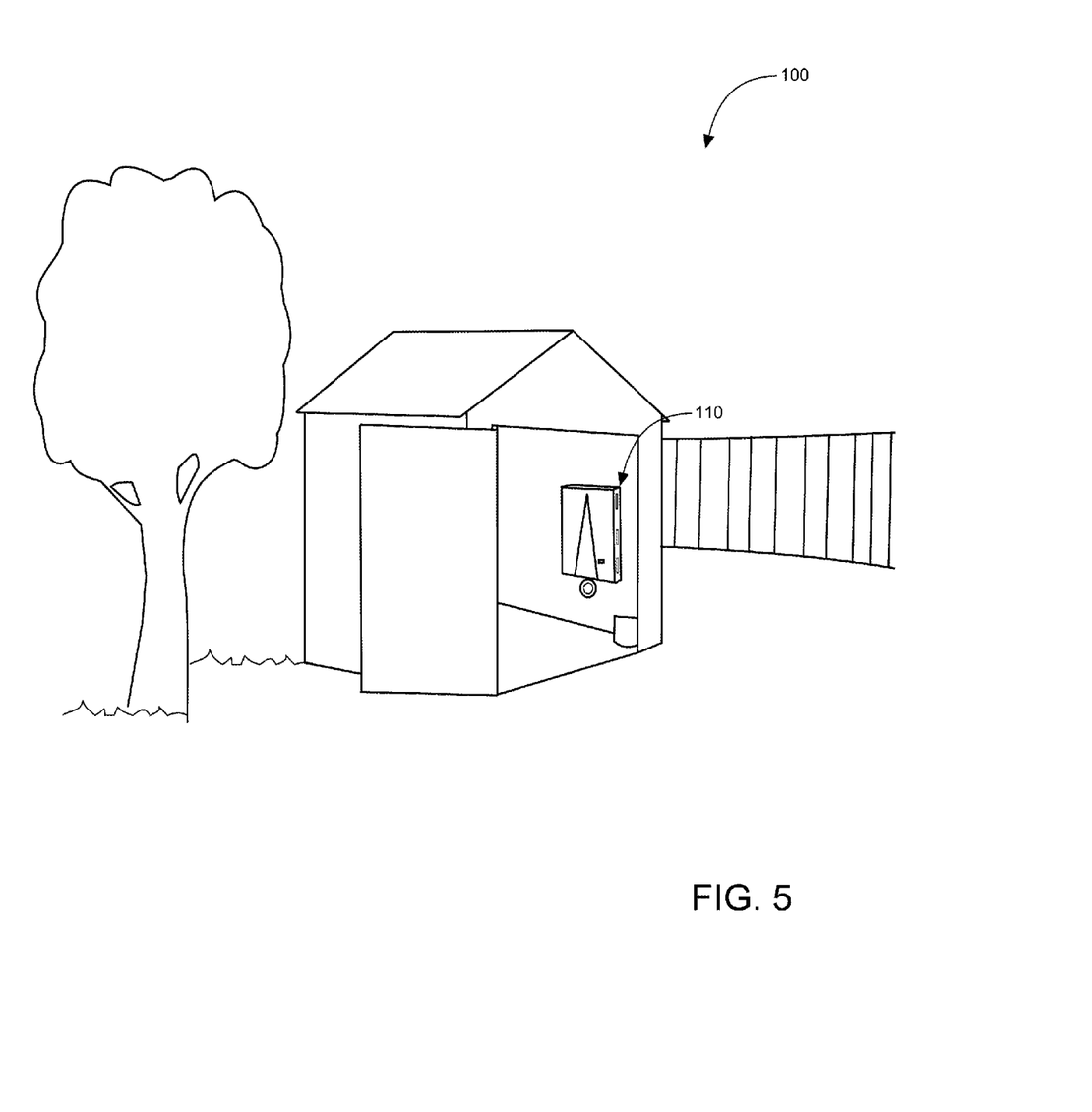
FIG. 5 is a perspective view illustrating the fold-away wheelbarrow of the fold-away wheelbarrow system in a storage condition according to an embodiment of the present invention of FIG. 1.

Referring now to FIGS. 3-5, showing perspective views illustrating fold-away wheelbarrow 110 in a folded storage-ready condition according to an embodiment of the present invention of FIG. 1. FIG. 4A specifically shows a perspective view illustrating the relative rotation of front planar surface 134 of body 120 of fold-away wheelbarrow 110, FIG. 4B is a perspective view of handle-stand 210 as rotated into a storage ready condition according to an embodiment of the present invention as shown in FIG. 3, FIG. 4C illustrating a perspective view of fork-mounted axle 180 and wheel 170 front-swivelly-mounted to lower frame 190 of fold-away wheelbarrow 110 according to an embodiment of the present invention as shown in FIGS. 1-3. FIG. 5 is a perspective view illustrating fold-away wheelbarrow 110 of fold-away wheelbarrow system 100 in a storage condition.

Fork-mounted wheel 182 (assembly of wheel 170 and fork-mounted axle 180) is preferably front-swivelly-mounted to lower frame 190. Lower frame 190 comprises a wishbone profile in this particular embodiment. Upon reading this specification, it should be appreciated that, under appropriate circumstances, considering such issues as user preferences, design preference, structural requirements, marketing preferences, cost, available materials, technological advances, etc., other framing arrangements such as, for example, boxed, linear, non-linear, etc., may be sufficient.

Handle-stand 210 is rotatable about a centerline axis between an in-use condition and a storage condition. Fold-away wheelbarrow 110 to be relationally-rotatably manipulated such that fold-away wheelbarrow 110 is foldable. Fold-away wheelbarrow 110 is able to be folded into a flat profile to provide a suitable storage condition. Handle-stand 210 preferably comprises two hand-grippable handles in the particular embodiment shown. In other embodiment handle-stand 210 may comprise one or multiple hand-grippable handles. Further, handle-stand 210 may comprise a u-shaped stand, as shown, thereby providing greater surface contact area between handle-stand 210 and ground, thereby enabling larger loads to be carried and rested by fold-away wheelbarrow 110 without sinking into a ground surface. Within the particular embodiment shown handle-stand 210 preferably comprises two hand-grippable handles and a u-shaped stand rotatable in relation to each other, forming an assembly that is both functional while using and may be easily folded into a storage condition. In this way the present invention occupies a smaller footprint of storage space.

A method for using a fold-away wheelbarrow 110 may comprise the steps of: step one unfolding fold-away wheelbarrow 110 into an in-use condition; step two receiving a carried-weight-load; step three carrying the carried-weight-load using fold-away wheelbarrow 110 as a second-class lever; step four rotating a front planar surface 134 into a parallel relationship adjacent first side planar surface 138 and away from second planar surface 140 to provide an unimpeded dumping side; and step five unloading the carried-weight-load. The method may further comprise the step six of folding fold-away wheelbarrow 110 into a storage profile. It should be noted that steps four and five are optional steps and may not be implemented in all cases. It should also be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A fold-away wheelbarrow comprising:
   a) a body having an inner volume,
   b) said inner volume defined by a bottom planar surface; a front planar surface; a rear planar surface; a first side planar surface; and a second side planar surface;
   c) a plurality of hinges;
   d) at least one wheel;
   e) a fork-mounted axle;
   f) a lower frame; and
   g) a handle-stand;
   h) wherein said body is mounted on said lower frame;
   i) wherein said plurality of hinges provide swingably-rotatable relationships between said front planar, said first side planar surface, said second side planar surface and said rear planar surface;
   j) wherein handle-stand comprises two handles protruding outwardly from said rear planar surface about 2 feet;
   k) wherein said two handles completely fold under said body during storage condition;
   l) wherein and handle-stand provides a lifter whereby an operator may manipulate said fold-away wheelbarrow during a load-moving period and said handle-stand provides a rester while in a stationary position;
   m) wherein said fold-away wheelbarrow is carried by said fork-mounted axle designed to distribute a carried-weight-load between said wheel and said operator thereby enabling convenient carriage of said carried-weight-load by said operator;
   n) wherein all components of said body are approximately ¼ inch thick; and
   o) herein fold-away wheelbarrow is foldable into a flat profile to provide said suitable storage condition.

2. The fold-away wheelbarrow of claim 1 wherein said fold-away wheelbarrow solely comprises plastic.

3. The fold-away wheelbarrow of claim 1 wherein said fold-away wheelbarrow comprises a second-class lever.

4. The fold-away wheelbarrow of claim 1 wherein said front planar surface is rotatable about said hinge such that said front planar surface comes into a parallel relationship adjacent said first side planar surface and away from said second planar surface.

5. The fold-away wheelbarrow of claim 4 wherein when said front planar surface comes into a parallel relationship adjacent said first side planar surface an unimpeded dumping side is thereby provided.

6. The fold-away wheelbarrow of claim 1 wherein said fork-mounted wheel is front-swivelly-mounted to said lower frame.

7. The fold-away wheelbarrow of claim 6 wherein said lower frame comprises a wishbone profile.

8. The fold-away wheelbarrow of claim 1 wherein said handle-stand is rotatable about a centerline axis between an in-use condition and a said storage condition.

9. The fold-away wheelbarrow of claim 1 wherein said bottom planar surface; said front planar surface; said rear planar surface; said first side planar surface; and said second side planar surface comprise a lidless box profile when in said load-moving period.

10. The fold-away wheelbarrow of claim 9 wherein said bottom planar surface is adjacent said front planar surface; said rear planar surface; said first side planar surface; and said second side planar surface and said front planar surface is opposed to said rear planar surface; said first side planar surface is opposed to said second side planar surface when in said load-moving period.

11. The fold-away wheelbarrow of claim 9 wherein said front planar surface is adjacent and perpendicularly relationally removably connected to said first side planar surface and said second side planar surface is adjacent and perpendicularly relationally removably connected to said rear planar surface when in said load-moving period.

12. The fold-away wheelbarrow of claim 1 wherein said hinges are located on at least one edge of said front planar surface; said rear planar surface; said first side planar surface; and said second side planar surface such that said front planar surface; said rear planar surface; said first side planar surface; and said second side planar surface are able to be relationally-rotatably manipulated.

13. The fold-away wheelbarrow of claim 1 wherein said hinges allow said fold-away wheelbarrow to be relationally-rotatably manipulated such that said fold-away wheelbarrow is foldable.

14. The fold-away wheelbarrow of claim 13 wherein said fold-away wheelbarrow is able to be folded into a flat profile to provide said storage condition.

15. The fold-away wheelbarrow of claim 1 wherein said handle-stand comprises two hand-grippable handles.

16. The fold-away wheelbarrow of claim 15 wherein said handle-stand comprises a u-shaped stand.

17. The fold-away wheelbarrow of claim 15 wherein said handle-stand comprises two hand-grippable handles and a u-shaped stand rotatable in relation to each other.

18. A fold-away wheelbarrow comprising:
   a) a body having an inner volume,
      i) said inner volume defined by a bottom planar surface; a front planar surface; a rear planar surface; a first side planar surface; and a second side planar surface;
   b) a plurality of hinges;
   c) at least one wheel;
   d) a fork-mounted axle;
   e) a lower frame comprising a wishbone profile; and
   f) a handle-stand;
   g) wherein said body is mounted on said lower frame;
   h) wherein said fold-away wheelbarrow comprises plastic;
   i) wherein said fold-away wheelbarrow comprises a second-class lever;
   j) wherein said plurality of hinges provide swingably-rotatable relationships between said front planar, said first side planar surface, said second side planar surface and said rear planar surface;
   k) wherein handle-stand comprises two handles protruding outwardly from said rear planar surface about 2 feet;
   l) wherein said two handles completely fold under said body during storage condition;
   m) wherein said front planar surface is rotatable about said hinge such that said front planar surface comes into a parallel relationship adjacent said first side planar surface and away from said second planar surface to provide an unimpeded dumping side as desired;
   n) wherein said fork-mounted wheel is front-swivelly-mounted to said lower frame;
   o) wherein said handle-stand is rotatable about a centerline axis between an in-use condition and a storage condition;
   p) wherein said hinges allow said fold-away wheelbarrow to be relationally-rotatably manipulated such that said fold-away wheelbarrow is foldable;
   q) wherein and handle-stand provides a lifter whereby an operator may manipulate said fold-away wheelbarrow during a load-moving period and said handle-stand provides a rester while in a stationary position;

r) wherein said lifter comprises two hand-grippable handles and said rester comprises a u-shaped stand rotatable in relation to each other;
s) wherein said fold-away wheelbarrow is carried by said fork-mounted axle designed to distribute a carried-weight-load between said wheel and said operator as said second-class lever thereby enabling convenient carriage of said carried-weight-load by said operator;
t) wherein all components of said body are approximately ¼ inch thick; and
u) wherein fold-away wheelbarrow is foldable into a flat profile to provide said suitable storage condition.

19. A method for using a fold-away wheelbarrow of claim 18 comprising the steps of:
a) unfolding said fold-away wheelbarrow into an in-use condition;
b) receiving a carried-weight-load;
c) carrying said carried-weight-load using said fold-away wheelbarrow as a second-class lever;
d) rotating a front planar surface into a parallel relationship adjacent a first side planar surface and away from a second planar surface to provide an unimpeded dumping side; and unloading said carried-weight-load.

20. The method of claim 19 further comprising the step of folding said fold-away wheelbarrow into a storage profile.

* * * * *